F. O. ANDERSON.
MACHINE FOR CUTTING BLIND DOVETAIL SLOTS.
APPLICATION FILED MAR. 6, 1914.
1,258,082.
Patented Mar. 5, 1918.
7 SHEETS—SHEET 5.
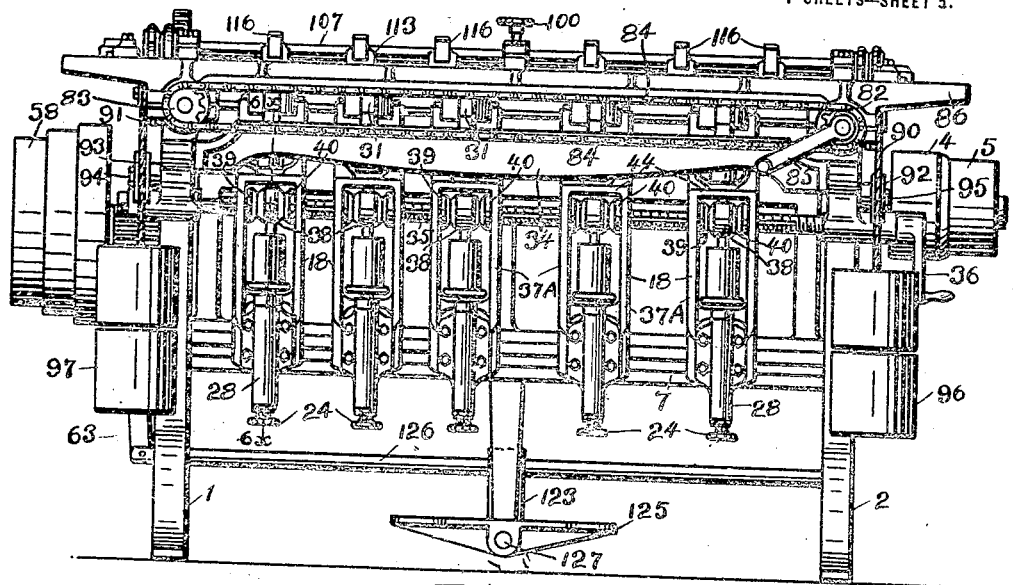
FIG. 5.
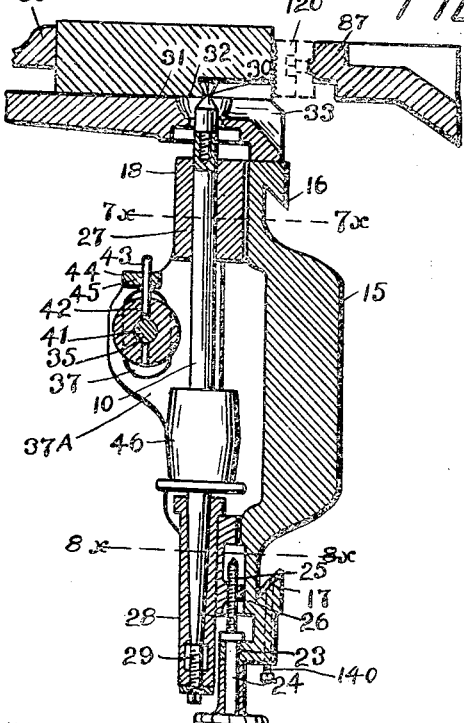
FIG. 6.
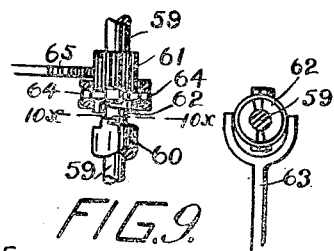
FIG. 9.   FIG. 10.
FIG. 7.
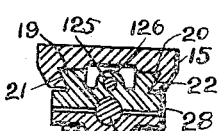
FIG. 8.
Witnesses
Eric Ischinger
Alice M. Johann
Inventor
Frank O. Anderson
By Frank Keefer
Attorney

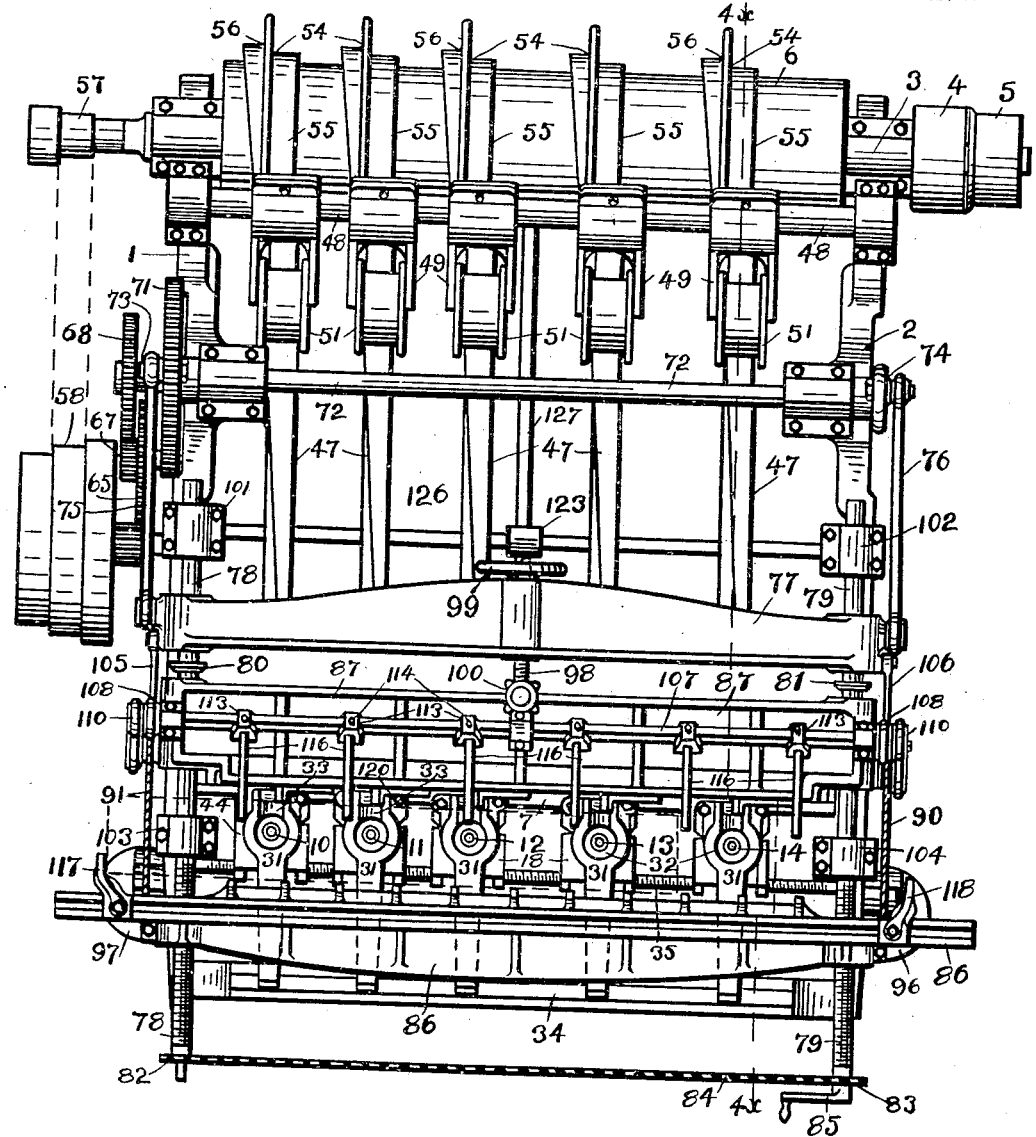

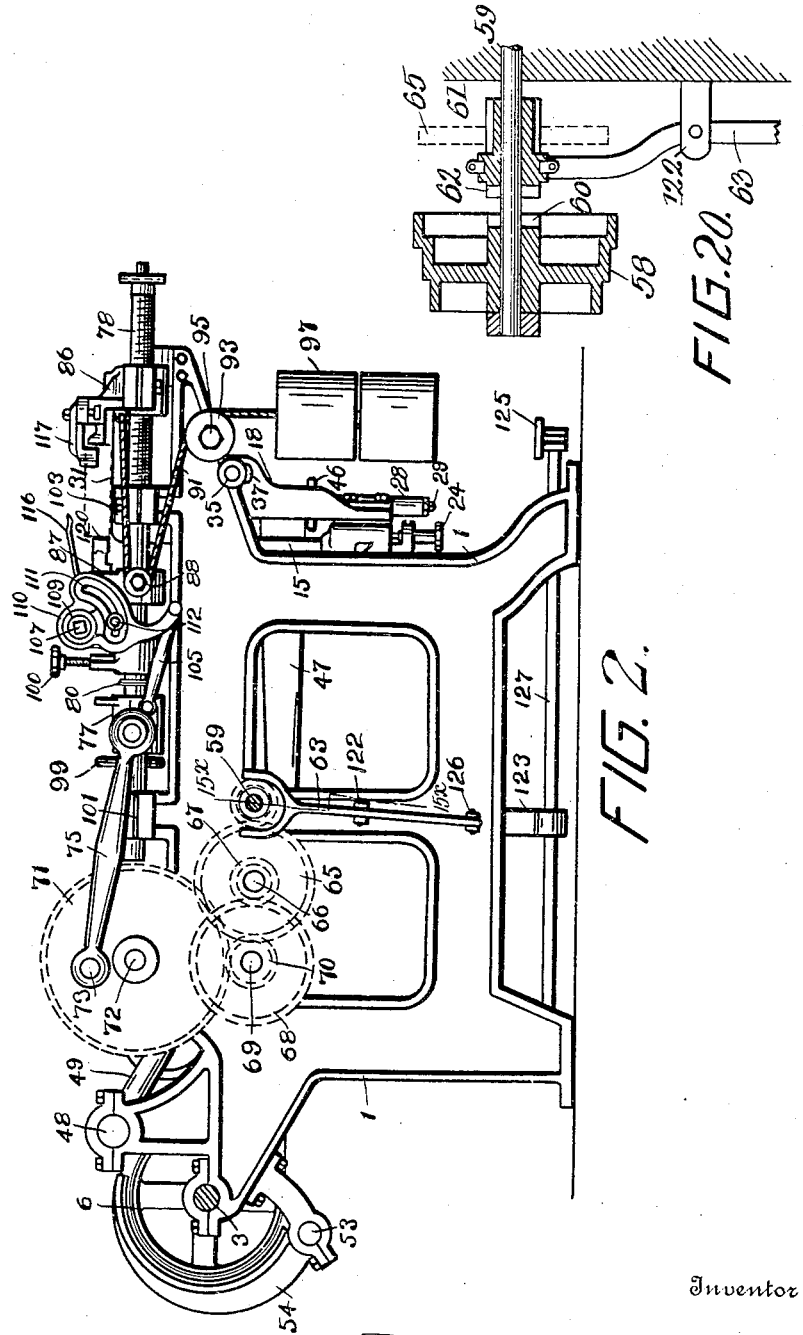

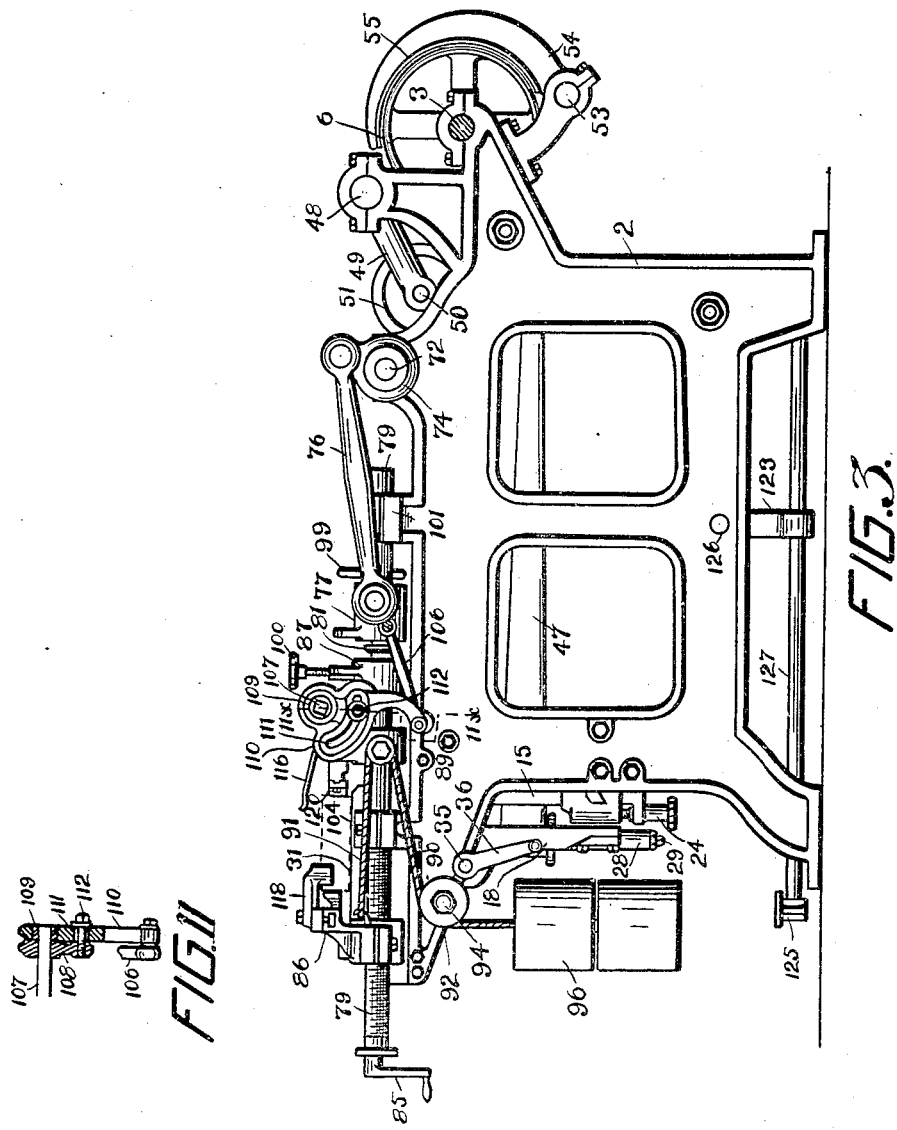

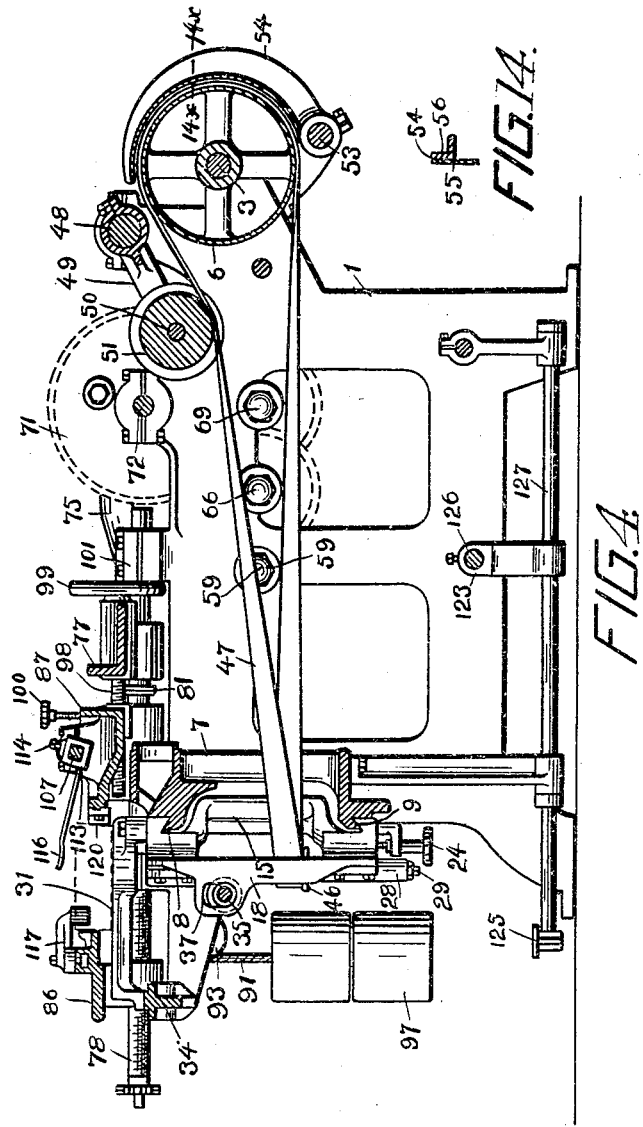
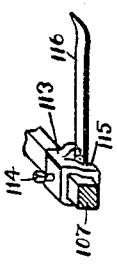
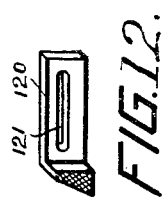
F. O. ANDERSON.
MACHINE FOR CUTTING BLIND DOVETAIL SLOTS.
APPLICATION FILED MAR. 6, 1914.
1,258,082.
Patented Mar. 5, 1918.
7 SHEETS—SHEET 4.

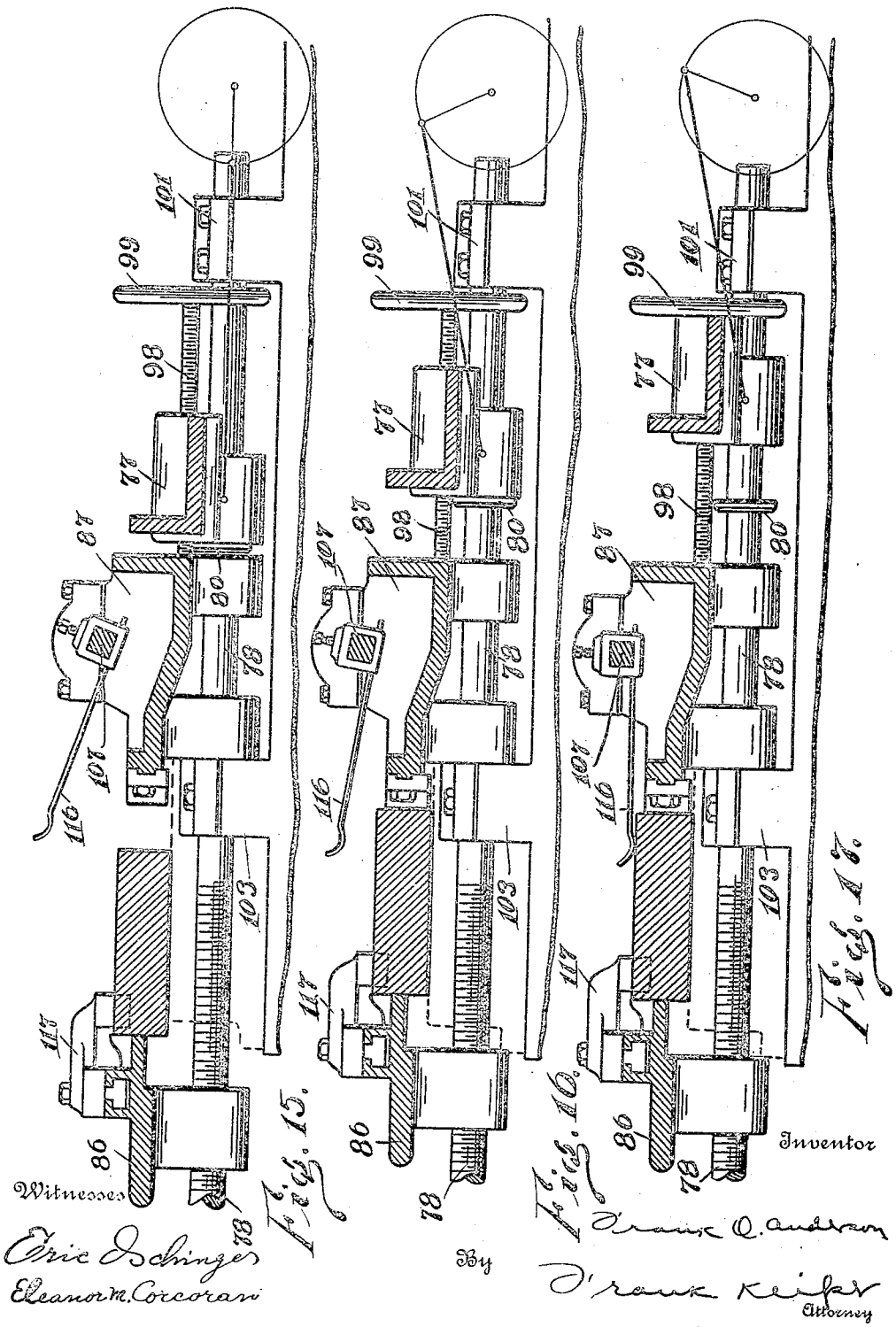

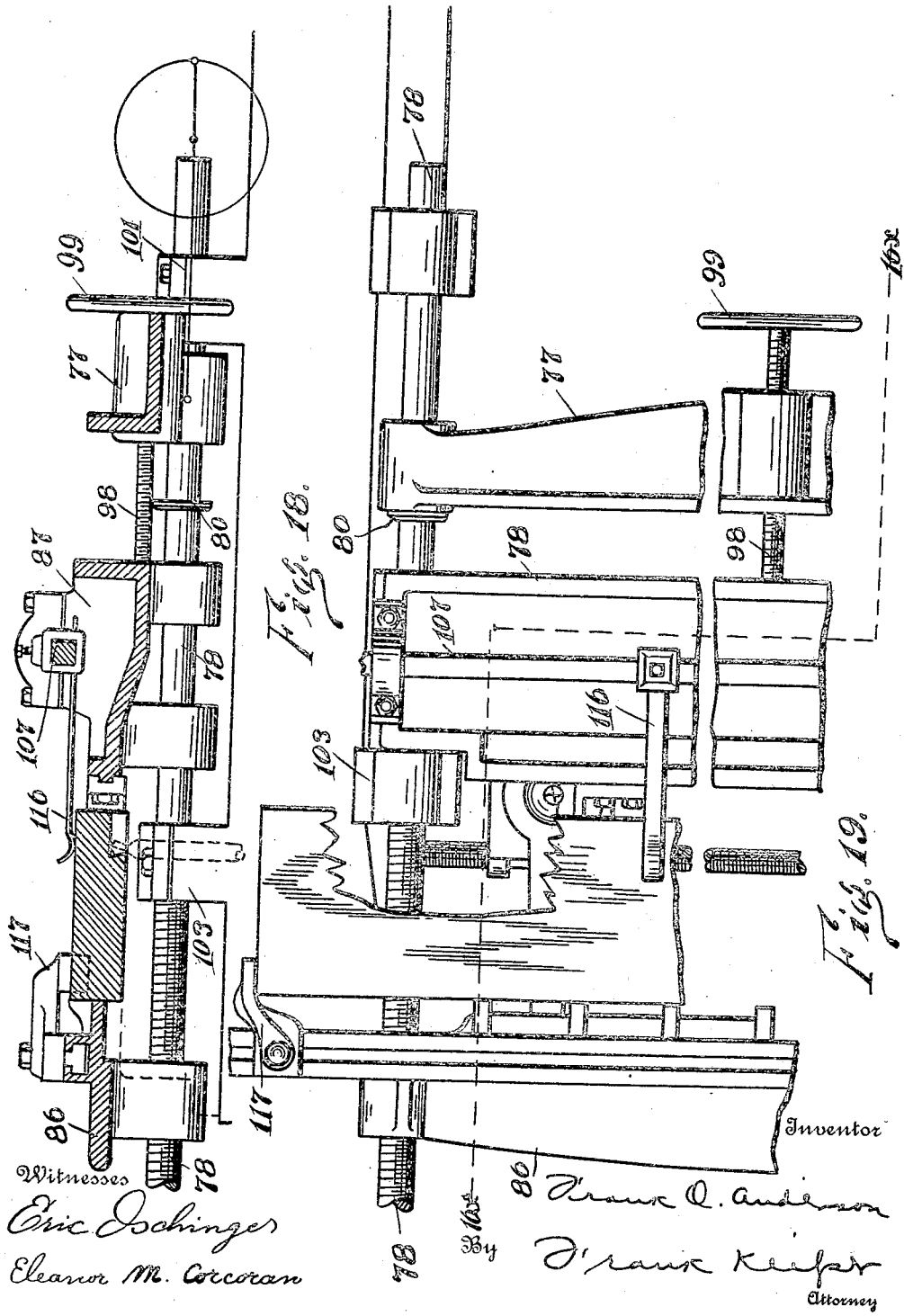

UNITED STATES PATENT OFFICE.

FRANK O. ANDERSON, OF JAMESTOWN, NEW YORK.

MACHINE FOR CUTTING BLIND DOVETAIL SLOTS.

1,258,082.  Specification of Letters Patent.  Patented Mar. 5, 1918.

Application filed March 6, 1914. Serial No. 822,871.

*To all whom it may concern:*

Be it known that I, FRANK O. ANDERSON, a citizen of the United States, residing at Jamestown, in the county of Chautauqua and State of New York, have invented certain new and useful Improvements in Machines for Cutting Blind Dovetail Slots, of which the following is a specification.

The object of this invention is to provide a machine for cutting dove tail holes.

Another object of the invention is to provide a machine that will simultaneously cut a plurality of dove tail holes.

Another object of the invention is to provide for the lateral adjustment or grouping of the cutters.

Another object of the invention is to provide special feeding mechanism for feeding the stock to the cutters or bits.

These and other objects of the invention will be fully illustrated in the drawings, described in the specification and pointed out in the claims at the end thereof.

In the accompanying drawings,

Figure 1 is a top plan view of the machine.

Fig. 2 is a side elevation of the machine looking at it from the left in Fig. 1.

Fig. 3 is a side elevation of the machine looking at it from the right in Fig. 1.

Fig. 4 is a vertical section on the line $4^x$—$4^x$ of Fig. 1.

Fig. 5 is a front elevation of the machine.

Fig. 6 is a section through one of the spindles taken on the line $6^x$—$6^x$ of Fig. 5, showing a piece of stock in position between the frame 87 and bar 86.

Fig. 7 is a horizontal section on the line $7^x$—$7^x$ of Fig. 6.

Fig. 8 is a horizontal section on the line $8^x$—$8^x$ of Fig. 6.

Fig. 9 is a detail view of the clutch through which the machine is driven.

Fig. 10 is a section taken on the line $10^x$—$10^x$ of Fig. 9.

Fig. 11 is a vertical section on the line $11^x$—$11^x$ of Fig. 3.

Fig. 12 is a perspective view of the chip breaker.

Fig. 13 is a perspective view of the clamp for holding the spring fingers.

Fig. 14 is a horizontal section through the guard 54 on the line $14^x$—$14^x$ of Fig. 4.

Fig. 15 is a vertical longitudinal section through the feeding carriage of the machine showing all the parts in the forward position with the stock merely inserted but not clamped.

Fig. 16 is a vertical longitudinal section through the feeding carriage showing the cross head shafts and cross bar moved rearward to the next position from that shown in Fig. 15 with the stock clamped, the section being taken on the line $16^x$—$16^x$ of Fig. 19.

Fig. 17 is a vertical longitudinal section through the feeding carriage showing the cross head in position to move the frame shafts, cross bar and stock collectively.

Fig. 18 is a vertical longitudinal section through the feeding carriage showing all the parts at the rear end of their movement with the dove tail slot cut into the stock.

Figs. 15 to 18 inclusive in inverse order also show the steps in the forward movement of the carriage to move the finished stock forward and release it, it being understood that the crank at the right of each figure turns continuously through a circle and will during the forward movement be with the connecting rod below the center instead of above the center as shown.

Fig. 19 is a top plan view of the parts of the carriage as shown in Fig. 16.

Fig. 20 is a section on the line $15^x$—$15^x$ of Fig. 2, the pulley 58 which is omitted from Fig. 2 being shown in place in section.

In the accompanying drawings like reference numerals indicate like parts.

This machine is built on the frames 1 and 2 which are preferably castings and from which the various parts of the machine are supported. On these frames is mounted the main power shaft of the machine 3 which shaft extends clear across the machine. On one end of the shaft as shown in Fig. 1, is the tight pulley 4 keyed to the shaft 3 and the loose pulley 5, the loose pulley 5 being somewhat less in diameter than the tight pulley 4. The loose pulley 5 is made of reduced diameter so that the belt which drives the machine will be loose when running thereon but the belt will be stretched when running on the driving pulley 4.

Keyed to the shaft 3 is the drum 6 which drum extends clear across between the supporting frames 1 and 2 of the machine. From this drum the dove tail bits or cutters of the machine are driven by belts as will presently be described. This drum is located at the rear of the machine and the boring tools are located at the front of the machine.

Extending transversely of the front of the machine is the upright table 7 which table is bolted or clamped in any suitable manner to the frames 1 and 2. This table has the guides 8 and 9 thereon extending the full length thereof. On this table are mounted the series of spindles which spindles are indicated in Fig. 1 by the reference numerals 10, 11, 12, 13 and 14, five being shown in that figure although it will be understood that any desired number of spindles may be used.

One of these spindles is shown in detail in Fig. 6, and consists of the spindle frame 15 having the guides 16 and 17 thereon by which it engages the corresponding guides 8 and 9 on the table 7 and on which table 7 it can be moved laterally and fastened in any position as will presently be described. Mounted to slide vertically on the spindle frame 15 is the spindle carrier 18 having the guides 19 and 20 thereon (see Fig. 7), which engage with corresponding guides 21 and 22 formed in the spindle carrier 15. One set of these guides is provided at the top of both the spindle frame and the spindle carrier and another set is provided at the bottom so that in the vertical movement of the spindle carrier 18, it is held to a right line motion. The spindle frame 15 has a bearing 23 on the lower end thereof in which works an adjusting screw 24, the upper end of which is threaded at 25. This screw is mounted to rotate in the bearing 23 but cannot move longitudinally therein. The spindle carrier 18 has a lug 26 with a threaded opening therein which lug is engaged by the screw 25 and by which, on the turning of the screw, the spindle carrier 18 is raised or lowered. The screw 25 is adjusted until the narrow neck of the cutter or bit is below the level of the bracket 31 as shown in Fig. 6 far enough to cut the hole of the proper width and depth. The spindle carrier has a plain bearing 27 at the top thereof and a tapered bearing 28 at the bottom thereof. Below the bearing 28 is an adjusting screw 29 forming a thrust bearing for the spindle 10. The lower end of the spindle 10 is tapered as shown in Fig. 6. The bearing 28 in which it runs is tapered to correspond and the screw 29 is adjusted so as to hold the spindle lightly seated in the bearing. The five spindles 10, 11, 12, 13 and 14 indicated in Fig. 1, are all alike and a description of any one of them will serve for all of them. On top of the spindle 10 is fastened the dove-tail bit or cutter 30. Carried on the spindle frame 15 is the horizontal bracket or sectional table 31 having an opening 32 therein through which the dove tail bit projects. A channel 33 extends rearwardly from the recess 32 through which the chips may be drawn as they are made by the cutting, the usual pipe or fan connection being provided for this purpose.

The several brackets or sectional tables 31 extend horizontally in line with each other and form a single table on which the stock rests when the bits 30 cut the dove tailed slots. The forward ends of all the brackets 31, are supported by the cross bar 34 and along which they are free to move as the spindle frames 15 are moved along the table 7. The lateral adjustment of the spindle frame 15 on the table 7 is secured as follows:

Extending across the machine is the screw 35 having a handle 36 thereon by which it may be turned. On the sides of the spindle carriers 18 are the flanges 37$^A$. In these flanges 37$^A$ are provided the slots 37. Through these slots extends the screw 35. In each spindle carrier 18 is mounted one nut 38 and two collars 39 and 40, one of these collars being on each side of said nut, holding the collars taking up the lost space between the nut 38 and the flanges of the spindle carrier 18 and holding them in fixed relation to each other. The screw 35 has a key way 41 therein and the collars 39 and 40 have keys which engage with the keyway 41 so that they turn with the screw shaft 35 and are free to move along the screw shaft. When the screw shaft 35 is turned the nuts 38, which have a threaded engagement therewith, will turn with the shaft and will not move longitudinally of the shaft. If however, the nut is held against turning, it will move longitudinally of the shaft and carry the spindle frame 15 with it as the shaft is turned and to secure this relative movement between the nut and the shaft, I provide for holding the nuts separately against turning as follows:

The nut is perforated transversely of the shaft with the pin hole 42. On top of each of the spindle carriers 18 is provided a transverse plate or flange 44 having a suitable perforation 45 therein. A pin 43 (see Fig. 6) is inserted through this perforation in the flange 44 and engages with the hole 42 in the nut and prevents it from turning. When the pin is in position holding the nut against turning, the shaft 35 can be turned and the spindle frame 15 controlled by said nut will be carried to the right or the left according to the direction of the rotation of the shaft 35. By leaving some nuts 38 loose and by holding others against rotation, particular ones of the spindle frames 15 can be moved laterally along the table 7 and any desired grouping or spacing of the spindles and spindle frames may be secured thereon.

That is, they can be spaced apart at equal or irregular distances as may be desired. When the desired setting is secured the pins 42 are removed so that any turning of the screw shaft 35 will not disturb the position of the spindles. After the spindle frames 15 have been set they may be clamped in position by the set screws 140 which are provided in the bottom of the frame. A plate 141 is provided in the guide 17 and is interposed between the guide 17 and the guide 9. The set screws 140 press this plate 141 against the guide 17 and by them the frame 15 is clamped in place on the table 7.

Each of the spindles is provided with the pulley 46 through which the spindle is driven by a belt 47 which is driven from the drum 6, the drum being used because it permits the shifting of the belts along the drum corresponding to the lateral shifting of the spindles so that the spindles will be properly driven from the drum regardless of their position on the table 7.

On top of the machine at the rear is mounted the shaft 48 on which are carried the arms 49 having the pins 50 thereon on which are mounted to rotate the idler or belt tightening wheels 51. One of these sets of parts is provided for each belt 47 that is driven by the drum 6. Each of the arms 49 has a split bearing surrounding the shaft 48 by which it may be clamped on the shaft 48 in any angular position with reference to the other arms so that any inequality in the length of the belts 47 will be compensated for by the positions of the arms 49 and all of the belts 47 will be under an even tension, or each belt may be under any desired tension. The shaft 48 is held against rotation in its bearings and the arms 49 are set rigidly thereon. The tension is regulated by the setting of the arms 49 in the desired angular position.

To throw any desired spindle out of operation without cutting or removing the belt, I provide as follows:

A shaft 53 is provided at the rear of the machine which shaft extends across the machine and is clamped and held stationary in suitable bearings. On this shaft are provided guards 54, one for each belt, each of which guards consists of two parts; a circular plate 55 and a circular stiffening angle 56 fastened thereto to give it the desired stiffness. When it is desired to throw any particular spindle out of operation, the appropriate arm 49 is released and swung upwardly which releases the tension of the belt 47 and makes it slack. The belt then can be placed on the plate 55 which plate is concentric with the drum and about a quarter of an inch away from it. By this plate 55 the belt is held off from the drum so that the drum can revolve inside of the belt without having any frictional engagement with the belt or with the guard which supports it. These guards 54 are clamped on the shaft 52 by split hubs shown in Fig. 4 so as to hold them in proper position.

The feeding of the stock to the cutters may be described as follows:

On the shaft 3 is provided a stepped pulley 57 from which runs a belt to a stepped pulley 58 which is mounted to rotate idly on the stud 59. Integral with the pulley 58 is the clutch member 60. Mounted to slide upon the stud 59 is a pinion 61 having a clutch member 62 integral therewith. A lever 63 having a forked end engages trunnions 64 carried on a collar loosely encircling the clutch member 62, the clutch member being free to turn independently of the collar.

The lever 63 is pivoted at 122. The lower end of the lever 63 engages with a fork provided on the end of the shaft 126 which slides in bearings in the frames 1 and 2. (See Figs. 2 and 5). Mounted at the center of the bottom of the machine at the front is a treadle 125 supported by a shaft 127 that runs from front to back of machine. On this shaft is mounted a crank 123 which engages with the shaft 126 to move it longitudinally so that when the treadle 125 is operated the shaft 127 is rocked with the crank 123, and the shaft 126 is moved longitudinally causing the rocking of the lever 63 which throws the clutch, shown in Fig. 9, into or out of engagement. When the clutch is in engagement the pinion 61 is driven by the pulley 58. It will be driven at either of three different rates of speed according to which of the steps on the pulleys 57 and 58 the belt is placed. The speed of the pinion 61 determines the speed at which the stock is fed to the cutters and its speed is independent of the speed with which the cutters revolve which is fixed by the peripheral speed of the drum 6.

The pinion 61 is elongated and maintains driving and sliding engagement with the gear 65. The gear 65 is mounted to turn on a stud 66.

A small pinion 67 is provided integral with the large pinion 65 and turning therewith. The small pinion 67 in turn meshes with the large pinion 68 mounted to turn on the stud 69. A small pinion 70 is provided integral with the large pinion 68 and turning therewith. A gear wheel 71 is mounted to turn on the shaft 72 which gear wheel 71 meshes with the pinion 70 and is driven thereby. The shaft 72 extends clear across the machine and is supported in bearings on both sides of the machine.

Mounted on the gear 71 is the crank pin 73 and keyed to the opposite end of the shaft 72 is the crank 74. In this manner the shaft 72 is provided with cranks at each end thereof. On these cranks are carried the connecting rods 75 and 76, the forward ends of which are connected with the cross head 77. Mounted to slide in suitable bearings 101, 102, 103 and 104 on top of the frames 1 and 2 are the sliding guide rods 78 and 79. On these sliding guide rods are the collars 80 and 81 fastened thereon against longitudinal movement in any suitable manner. The ends of the cross head 77 have a loose sliding engagement on the guide rods 78 and 79. The cross head 77 moves independently of the sliding guide rods except when it encounters the collars 80 and 81 in its forward movement, when it causes the guide rods to move forward with it. The forward ends of the guide rods 78 and 79 are threaded as shown in Fig. 1. On the forward ends of these guide rods are carried the sprocket wheels 82 and 83, which sprocket wheels are connected by the chain 84. A handle 85 is provided on the guide rod 79 by which it may be turned and through the chain 84 and sprocket wheels, the guide rod 78 will rotate in unison therewith. On the guide rods 78 and 79 at the front of the machine is carried the cross bar 86 which cross bar has threaded bearings therein with which the threaded ends of the guide rods 78 and 79 engage so that on the rotation of these guide rods, the cross bar 86 will be adjusted forward or back. It will be seen from the foregoing that when the guide rods 78 and 79 move forward, due to the contact between the cross head 77 and the collars 80 and 81, the cross bar 86 will move forward as well, so that for a portion of the travel of the cross head 77, the cross bar 86 moves forward in unison with it.

Mounted to slide freely upon the guide rods 78 and 79 is the frame 87. On the ends of this frame are the pulleys 88 and 89. Fastened to the bar 86 are the ropes or chains 90 and 91, which ropes pass back over the pulleys 88 and 89 on the frame 87 and forward around the idle pulleys 92 and 93 mounted on studs 94 and 95 carried on the frame of the machine. On the ends of the ropes are provided weights 96 and 97 which weights, through the connections described, tend to draw the frame 87 and cross bar 86 together. The frame 87 is restrained in its forward movement by the cross head 77 through connections which I will now describe.

An adjusting screw 98 is provided on the cross head 77 having a threaded engagement with the frame 87. This adjusting screw passes loosely through the cross head 77 and has the hand wheel 99 on the rear end thereof. A clamping screw 100 is provided on the frame 87 for clamping it in any desired position. When the cross head 77 moves rearwardly it encounters the hand wheel 99 and draws the frame 87 rearwardly with it through the connections heretofore described.

The forward movement of the frame 87 is due entirely to the weights and rope pulling thereon and is limited by the frame 87 coming in contact with the bearings 103 and 104, by which its further forward movement is arrested. Its rearward motion is due to the pull of the cross head 77 communicated to it through the screw 98 and the extent of its rearward movement will depend upon the setting of the screw. The greater clearance between the screw head or hand wheel 99 and the cross head 77, the less will be the movement communicated by the cross head 77 to the frame 87. The movement of the bar 86 and of the guide rods 78 and 79 rearwardly is due primarily to the pull of the weights 96 and 97 and is limited by the setting of the bar 86 on the guide rods 78 and 79, and is arrested when the bar 86 makes contact with the stock that is clamped between the bar 86 and the frame 87, or if no stock is present the bar 86 is arrested when the collars 80 and 81 on the guide rods 78 and 79 make contact with the cross head 77. When the frame 87 moves rearwardly, drawn by the screw connection between the frame 87 and cross head 77, as heretofore described, the bar 86 moves with it due to the chain connections 90 and 91. The stock is laid back of the bar 86 when it is in its forward position. The bar 86 then carries it backward as the bar 86 is moved back by the weights 96 and 97. The weights first descend drawing the bar 86 back until the stock is pressed against the frame 87 and thereafter the stock is clamped firmly between the frame 87 and bar 86, due to the pull of the weights 96 and 97. After the stock is clamped between the frame 87 and bar 86 the frame 87 and bar 86 move rearwardly together carrying the stock between them. The joint movement of the frame 87 and bar 86 is due to the combined pull of the screw 98 on the frame 87 and the pull of the weights 96 and 97 on the bar 86 through the frame 87. The weights 96 and 97 descend during the first part of the rearward movement of the bar 86 and continue to descend until the bar 86 makes contact with the frame 87 or with the stock that is placed between the bar 86 and frame 87 when the weights stop descending. Immediately thereafter the cross head 77 pulls away from the collars 80 and 81 and makes contact with the hand wheel 99 through which it begins to draw on the frame 87 which, as it moves rearwardly, draws up the weights 96 and 97 and draws the bar 86 after it. The weights hold the frame 87 against rearward movement until force is applied to it sufficient to lift the weights.

This force is applied as follows:

The cranks 73 and 74 through the connecting rods 75 and 76 pull the cross head 77 rearward. The cross head 77 engages the hand wheel 99 and through it and the screw 98 pulls the frame 87 rearwardly during a part of the travel of the cross head. As the frame 87 moves rearward it pulls up the weights 96 and 97 and draws the bar 86 rearward as well. Until the bar 86 clamps the stock against the frame 87 the weights 96 and 97 will cause the bar 86 and guide rods 78 and 79 to move rearwardly as fast as the cross head 77 moves and will keep the collars 80 and 81 pressed against the cross head. But when the rearward movement of the bar 86, due to the falling of the weights is stopped by the stock and the frame 87, the movement of the guide rods 78 and 79 is stopped as well so that the cross head draws away from the collars 80 and 81 and the rearward movement of the stock is not resumed until the cross head 77 makes contact with the hand wheel 99, drawing frame 87, bar 86 and the stock after it. In no case should the bar 86 make contact with the bearings 103 and 104 as such contact would prevent the bar 86 from moving in unison with the frame 87 and would loosen the grip on the material that is carried between them.

The rearward movement of the frame 87 determines the length of cut made on the stock by the bits or cutters on the spindle and the setting of the bar 86 on the guide rods 78 and 79 determines to a considerable extent the width of the stock that can be clamped between the bar 86 and the frame 87, it being understood that on the forward movement of the bar 86 it is necessary to separate the bar 86 from the frame 87, a distance somewhat greater than the width of the stock to be clamped between them so as to give ample time for the removal of the finished piece and the insertion of the new piece in its stead, giving space over and above the width of the stock in which the hands of the operator may work in so doing.

The cross head 77, the frame 87 and cross bar 86 will move forward together until the frame 87 strikes the bearings 103 and 104 when its forward movement stops and the forward movement of the bar 86, so far as it is caused by the frame 87, is also arrested. The cross head 77 however, continues its forward movement until it strikes the collars 80 and 81 on the guide rods 78 and 79 when it pushes these guide rods forward carrying with them the bar 86 which bar 86 draws with it the ropes 90 and 91 and raises the weights 96 and 97. This last movement of the bar 86 separates it from the frame 87 and releases the stock that is clamped therebetween so that the stock may be removed and a new piece inserted in its stead. The bar 86 is in its extreme forward position when the cranks 73 and 74 are at the end of their forward throw and when these cranks begin to move backward they carry with them the cross head 77 which as it moves backward releases the guide rods 78 and 79 and permits the weights 96 and 97 to draw backward the bar 86 which in turn moves the guide rods 78 and 79 backward and presses with the collars 80 and 81 against the cross head 77. Regulated in this manner, the bar 86 moves back as rapidly as the rotating of the cranks will permit, until the bar 86 encounters the stock that has been laid between it and the frame 87.

The frame 87 always rests against the bearings 103 and 104 when the cranks 73 and 74 are on the forward center. The rearward movement of the frame 87 does not begin until the cross head 77 encounters the hand wheel 99. If the hand wheel is extended far to the rear the frame 87 will move but little in common with the cross head 77 and the slots cut in the stock will be short while if the hand wheel is set to keep the parts 87 and 77 close together, the frame 87 will have a long travel and the slots cut by the cutters will be correspondingly long. As shown in Fig. 1 the parts 87 and 86 are set to receive a piece of wide stock between them and give it a long travel, this position being chosen because the cutters are exposed to view thereby and are not concealed by the frame 87. The stock is illustrated by dotted lines in Figs. 1, 2, 3 and 4 and is shown between the bar 86 and frame 87, the dotted lines shown being used so as not to obscure the parts of the machine that would be hidden if the stock were shown in full lines.

Fastened to the cross head 77 are the links 105 and 106. Mounted on the frame 87 is the rock shaft 107, which rock shaft is preferably square in cross section and has keyed thereto the crank 108, one on each end of the shaft. On the outer end of the shaft 107 is the collar 109 forming a bearing for the crank 110, this crank being free to swing on the collar. The crank 110 has the segmental slot 111 therein. Carried on the crank 108 is the stud 112 which makes threaded engagement with the crank 108. This stud 112 passes through the segmental slot 111 and the head of it is adapted to engage with the crank 110 and clamp it to the crank 108 so that the cranks 108 and 110 can be shifted in their angular relation to each other and fastened together and made to rock in unison. The shaft 107 carries thereon the stirrup clamps or yokes 113, which clamps embrace the shaft 107 and can slide thereon and can be fastened in any position thereon by the set screw 114. The clamp 113 has stirrups 115 thereon between which and the shaft 107 can be placed the spring fingers 116, which fingers are clamped between said stirrups and the shaft 107 on the tightening of the screw 114. The fingers 116 may be moved in and out through the clamp 113 so as to make them long or short as may be desired according to the width of the stock that they are intended to work with and the angular adjustment between the cranks 108 and 110 is determined by the thickness of the stock that the fingers 116 are intended to work with.

Carried on the bar 86 are the gages 117 and 118 which are capable of adjustment longitudinally along the bar 86, between which gages or against either one of them the stock is to be placed when the bar 86 is near the end of its forward stroke or at the beginning of the rearward stroke. These will hold the successive pieces of stock in the same relative position to the cutters so that the dove tail holes will all have the same relative position.

Where the cutters enter the wood they tend to compress the wood on one side of the hole and tear it out or splinter it on the other side of the hole. This splintering sometimes makes the wood ragged at the edge of the hole. To prevent this and hold the wood from being broken up, I provide chip breakers 120, shown in detail in Fig. 12. These chip breakers are carried on the front edge of the frame 87 at the top and are placed on the right or left side of the cutter according to the direction in which the cutter is turning. The beveled edge of the chip breakers is set so as to pass as close to the cutter as possible without interfering with the cutter and its shape supplements the shape of the cutter so as to cause the chips cut by the cutter to break off sharp at the edge of the cut without taking a splinter out of the adjacent wood with them. To make them adjustable they are provided with the slot 121 through which they are fastened by screws to the frame 87. The frame 87 is provided with threaded holes at suitable intervals to receive the fastening screws.

The setting of my machine may be described as follows:

First the spindle carriers 15 are adjusted laterally on the table 7 by the turning of the screw shaft 35 in the manner heretofore described. The spindles 10, 11, etc., are then adjusted vertically by the setting of the screw 24. The arms 49 with the idlers 51 are adjusted laterally on the shaft 48 and are clamped in the proper angular position and the belts 47 are arranged to correspond. Such belts as are not in use will be shifted to the guards 54 by which they are held idly and their arms 49 will be raised. The hand wheel 99 is turned so that the frame 87 will move in the proper relation to the cross head 77 to secure the proper length of the cut. The guide rods 78 and 79 are then turned by the handle 85 to bring the cross bar 86 to correct position adjusting it to the width of the stock and the length of travel which it is to have independent of the frame 87. The gages 117 and 118 are set to hold the stock lengthwise between the frame 87 and bar 86 in proper relation to the cutters.

The chip breakers 120 are shifted laterally according to the setting of the spindle frames 15. The cranks 108 and 110 are shifted according to the thickness and the width of the stock and the fingers 116 are set accordingly.

With this setting of the machine, the shaft 127 is rocked by moving the treadle 125 and the clutch member 62 is operated. The stock to be cut by the machine is placed behind the bar 86 when it is in its extreme forward position and between the gages 117 and 118 and against either one of them. It is then carried backward against the frame 87 and is carried farther backward between the bar 86 and frame 87 against the cutters which cut the dove tails therein. The frame 87 and bar 86 then move forward until the frame 87 comes in contact with the bearings 103 and 104 by which its further forward movement is arrested and the bar 86 moves farther forward due to the impact of the cross head 77 upon the collars 80 and 81 which impact is transmitted through the guide rods 78 and 79 to the bar 86 causing the bar to move forward and release the stock. The stock can then be removed from the machine and a new piece inserted.

It will be understood that the drum 6 is regarded as placed at the rear end of the machine and the cutters and bar 86 are located at the front end of the machine and the movements of the parts as forward and back are described accordingly. The frame 87 and bar 86 together constitute a carriage for the carrying of the stock and will be referred to as such at times in the claims.

I claim:

1. In a machine for cutting blind dove tail slots, the combination of a stationary frame, a cross head, means whereby said cross head is reciprocated, a frame mounted to slide with the cross head, and an adjustable lost motion connection between said cross head and said sliding frame, by which a variable part of the movement of the cross head is communicated to the frame by which a variable depth of cut in the stock is secured, and cutting tools placed adjacent to the sliding frame against which the stock moves with the movement of the sliding frame, the length of the movement of the stock being determined by the movement of the sliding frame.

2. In a machine for cutting dove tail slots the combination of a stationary frame, two pairs of bearings thereon, a clamp mounted to slide on said frame, said clamp comprising a guide rod mounted to slide in each of said pairs of bearings, a bar mounted on said guide rods and having a threaded engagement with each of said guide rods, a cross head mounted to slide on said guide rods, a frame mounted to slide on said guide rods between said cross head and said bar an adjustable connection providing lost motion between said cross head and said frame for drawing the frame rearwardly after the cross head, means causing the cross head to move the guide rods but allowing lost motion between the cross head and guide rods.

3. In a machine for cutting dove tail slots the combination of a stationary frame, two pairs of bearings thereon, a guide rod mounted to slide in each of said pairs of bearings, a bar mounted on said guide rods and having a threaded engagement with each of said guide rods, a cross head mounted to slide on said guide rods, a frame mounted to slide on said guide rods between said cross head and said bar, an adjustable connection providing lost motion between said cross head and said frame for drawing the frame rearwardly after the cross head, a pair of weights joined by flexible connections with said sliding frame, said flexible connections passing over pulleys mounted on stationary axles on the fixed frame, said weights tending to pull the sliding frame forward against the rearward pull of the cross head, means causing the cross head to move the guide rods but allowing lost motion between the cross head and guide rods.

4. In a machine for cutting dove tail slots the combination of a fixed frame, two pairs of bearings in said frame, guide rods mounted to slide in said bearings, a bar mounted to slide with said guide rods, a frame mounted to slide on said guide rods, flexible means fastened to said bar passing over pulleys on the sliding frame and over pulleys on the fixed frame, weights at the ends of said flexible means, said weights tending to draw the bar and sliding frame toward each other.

5. In a machine for cutting dove tail slots the combination of a fixed frame, a bar and a sliding frame mounted to slide on said fixed frame, flexible connections between said bar and sliding frame and the fixed frame, weights on said flexible connections for moving the sliding frame forward in the machine and for drawing the bar and sliding frame together.

6. In a machine for cutting dove tail slots the combination of cutters, a moving frame having chip breakers depending therefrom, means for pressing a piece of wood against the frame and chip breakers and against the cutters, said chip breakers bearing against the piece of wood in position to break off the chips cut by said cutters, each of said chip breakers being adjustable along the frame independent of the others with uniform or variable spaces between them.

7. In a machine for cutting dove tail slots the combination of a table adapted to receive stock for cutting a frame and bar adapted to clamp the stock between them and move the stock over said table, a rock shaft having fingers thereon, means to rock said fingers into contact with the stock on said table before the movement of the stock begins and hold it in contact with the table during the movement of said frame and stock.

8. In a machine for cutting dove tail slots the combination of a table, adapted to receive stock for cutting, a frame and bar, adapted to clamp the stock between them and move the stock over said table, a rock shaft having fingers thereon, means to rock said fingers into contact with the stock on said table before the movement of the stock begins and hold it in contact with the table during the movement of said frame and stock, said means comprising a pair of cranks for driving said rock shaft, said cranks being mounted concentrically with each other one of said cranks being rigid with the rock shaft, a driving means positively fastened to the other crank, said cranks being capable of being clamped together in any desired angular relation.

9. In a machine for cutting dove tail slots the combination of a frame, a rock shaft mounted to rock on said frame, a crank mounted to rock with said shaft, a second crank mounted to rock on said shaft and being concentric with the first named crank, means for positively rocking the second crank, thereby rocking the first crank and rock shaft, fingers on said rock shaft coöperating with the frame to hold lumber thereon during the whole movement of the frame.

10. In a machine for cutting dove tail slots the combination of a frame, bearings provided thereon, a pair of guide rods mounted to slide in said bearings, said guide rods being connected for simultaneous movement, a series of members mounted on said guide rods, one of said members being movable relative to the other to clamp the stock between them and then movable together with the stock to feed it to the cutters, and means reactively connecting the two members for holding them together during their joint movement.

11. In a machine for cutting dove tail slots, the combination of a stationary table, a series of spindles arranged in a row having tools mounted on the top thereof projecting through said table, a carriage consisting of two cross members arranged parallel to said row of spindles and placed on opposite sides thereof, one of said members having movement while the other member remains stationary, both of said members thereafter moving together for the purpose of carrying stock between them over the tools mounted on said spindles and means reactively connecting said members for holding them together during their joint movement.

12. In a machine for cutting blind dove tail slots, the combination of a reciprocating member, means for reciprocating said member continuously and uniformly, a second member adjacent thereto and having an adjustable sliding connection therewith by which the second member is drawn after the first member for a part only of its movement and a variable cut in the stock is secured, a third member acting with the second member as a clamp, means for drawing the second and third members together when the first member moves in one direction, and means operated by the first member for separating the second and third members when the first member moves in the opposite direction.

13. In a machine for cutting blind dove tail slots, the combination of a stationary frame, a cross head mounted to slide thereon, means whereby the cross head is reciprocated continuously on the frame, a sliding frame mounted to reciprocate on the stationary frame, a lost motion engagement between the cross head and the slidable frame whereby the cross head causes the sliding frame to move in one direction, said engagement being adjustable to vary the length of movement of the sliding frame and thereby fix the length of the cut, and means to engage and move the work in one direction and slidably guided means for clamping the work to said last named means.

14. In a machine for cutting blind dove tail slots, the combination of a stationary frame, a cross head mounted to slide thereon, means whereby the cross head is reciprocated continuously on the frame, a sliding frame mounted to reciprocate on the stationary frame, a lost motion engagement between the cross head and the slidable frame whereby the cross head causes the sliding frame to move in one direction, said engagement being adjustable to vary the length of movement of the sliding frame and thereby fix the length of the cut, means to engage and move the work in one direction and slidably guided means for clamping the work to said last named means, and cutting tools for cutting the slots in the work, said sliding frame adapted to determine the position of the stock with reference to the cutting tool.

15. A machine for cutting blind dove tail slots, comprising a stationary frame, a pair of guide rods mounted to slide on said frame, a frame slidable on the guide rods, a cross head mounted to slide on and with said rods, an adjustable lost motion connection between the cross head and slidable frame, cutting tools for cutting slots in the work, and a jaw between which and the slidable frame the work is clamped, said jaw being attached to the guide rods for movement therewith.

16. In a machine for cutting blind dove tail slots, the combination of a stationary frame, a pair of guide rods mounted to slide on said frame, a cross head mounted to slide on and with said guide rods, means to cause said cross head to move rearwardly, first moving with the guide rods, then sliding along the guide rods and then moving again with the guide rods, means to cause said cross head when moving forward to first move with the guide rods, then slide on the guide rods and then move again with the guide rods to the end of its movement, a cross bar fastened to said guide rods and moving therewith, and a frame resting on said guide rods and capable of movement independently thereof and yielding means for drawing said cross bar and frame toward each other without interfering with the additional movements thereof, means for holding the guide rods stationary while the cross head slides thereon.

17. In a machine for cutting blind dove tail slots, the combination of a stationary frame, a cross head mounted to slide thereon, automatic means for reciprocating the cross head continuously through a regular travel, a sliding frame mounted to reciprocate on the stationary frame, connections between said sliding frame and the cross head whereby the sliding frame moves with the cross head during a part only of the movement thereof and is permitted to remain at rest during the balance of the movement of the cross head, said connections comprising a screw extending beyond the cross head and having a head thereon with which the cross head engages as it moves away from the frame.

18. In a machine for cutting blind dove tail slots, the combination of a stationary frame, a cross head mounted to slide thereon, means for reciprocating said cross head continuously and uniformly, connections between the sliding frame and the cross head whereby said frame moves with the cross head during a part only of the movement thereof and is permitted to remain at rest during the balance of the movement of the cross head, said connections being adjustable to increase or diminish the movement of the sliding frame at will, and cutting devices for cutting slots in the stock, said sliding frame being adapted to determine the position of the stock with reference to the cutting tools.

19. A machine for cutting blind dove tail slots, comprising a stationary frame, a pair of guide rods mounted to slide thereon, said rods having means to engage and move the work in one direction, a cross head mounted to slide on and with said guide rods, a sliding frame reciprocable on the stationary frame, means also slidably guided on said rods for clamping the work to the first named work engaging means, an adjustable lost motion connection between the sliding frame and cross head and permitting the cross head to move in one direction, first with the guide rods, and then sliding along said rods and then moving again with the guide rods, and cutting appliances to which the work is advanced and by which slots are cut therein.

20. In a machine for cutting blind dove tail slots the combination of a supporting frame having stops thereon, guide rods mounted to slide through said stops, a collar on each guide rod, a cross bar connected to said shafts and a cross head sliding on said guide rods engaging with said collar to move said guide rods and cross bar in one direction, a frame mounted to slide on said guide rods, and rope and weight connections between said frame and cross bar whereby said cross bar alone is first moved and the frame and cross bar are then moved together.

21. In a machine for cutting blind dove tail slots the combination of a cross head and a moving frame, lost motion connections between the cross head and the moving frame whereby the frame is moved during a part only of the movement of the cross head, clamping fingers carried on the frame, and connections between said clamping fingers and the cross head whereby said fingers are operated during the lost motion of the cross head, said connections between the cross head and the frame being adjustable to vary the lost motion of the cross head, the connections between the fingers and the cross head being adjustable to insure the engagement of the fingers with the stock just before the cross head begins to move the frame.

22. In a machine for cutting blind dove tail slots the combination of a support, and means to reciprocate stock along said support, said means including three clamping devices operating automatically on the front, rear and top of the stock to first clamp the stock horizontally and vertically on the support and then move it along the support.

23. In a machine for cutting blind dove tail slots the combination of a support, and means to reciprocate stock along said support, said means including three clamping devices operating automatically on the front, rear and top of the stock to first clamp the stock horizontally and vertically on the support and then move it forward and back on the support and then automatically release it.

24. In a machine for cutting blind dove tail slots the combination of a carriage comprising a cross bar and frame adapted to clamp stock between them, and chip breakers adjustably mounted on said frame, said frame clamping against the stock only with said chip breakers, each of said chip breakers being adjustable independent of the others.

25. In a machine for cutting blind dove tail slots the combination of a carriage, chip breakers for clamping the stock in place in said carriage, and cutters for cutting slots in the stock, said chip breakers protecting the edges of the stock from being split by the cutters, each of said chip breakers being adjustable independent of the others.

26. In a machine for cutting blind dove tail slots the combination of a frame and a cross head mounted to reciprocate together, the cross head having an additional movement independent of the frame, a shaft mounted to rock on the frame, a crank on said shaft, a link connecting said crank and said cross head whereby rocking movement is imparted to the shaft when the cross head moves independent of the frame, said shaft remaining stationary when the cross head and frame move together, means for positively drawing the frame after the cross head to permit the stock to advance with the frame to the cutters.

27. The combination of a bar and a frame constituting the opposing jaws of a clamp, yielding means tending to move said bar and frame toward each other, and so engaging a fixed support that resistance of bar and frame to relative motion causes a tendency of both to move in one direction, means producing reciprocating motion, and connections between said means and said bar and frame, allowing lost motion between said means and each of the others, whereby the bar may yieldingly clamp the work against the frame and the latter be fed by the reciprocating means in one direction the desired distance, and both be moved thereby in the opposite direction.

28. The combination of a bar and a frame, constituting the opposing jaws of a clamp, yielding means tending to move said bar and frame toward each other, and so engaging a fixed support that resistance of bar and frame to relative motion causes a tendency of both to move in one direction, means producing reciprocating motion, and connections between said means and said bar and frame, allowing lost motion between said means and each of the others, whereby the bar may yieldingly clamp the work against the frame and the latter be fed by the reciprocating means in one direction the desired distance, and both be moved thereby in the opposite direction, the relative lost motion provision being such that the bar will be moved a greater distance than the frame in one direction.

29. The combination of a bar and a frame constituting the opposing jaws of a clamp, yielding means tending to move said bar and frame toward each other, and so engaging a fixed support that resistance of bar and frame to relative motion causes a tendency of both to move in one direction, means producing reciprocating motion, and connections between said means and said bar and frame, allowing lost motion between said means and each of the others, whereby the bar may yieldingly clamp the work against the frame and the latter be fed by the reciprocating means in one direction the desired distance, and both be moved thereby in the opposite direction, and means for clamping the work transversely to the bar and frame, operated by the reciprocating means in the period of lost motion of its connection with the frame.

30. In a machine for cutting dove tail slots the combination of a stationary frame, two pairs of bearings therein, a clamp mounted to slide on said frame, said clamp comprising a guide rod mounted to slide in each of said pairs of bearings, a bar mounted on said guide rods and having a threaded engagement with each of said guide rods, a cross head mounted to slide on said guide rods, a frame mounted to slide on said guide rods between said cross head and said bar an adjustable connection providing lost motion between said cross head and said frame for drawing the frame rearwardly after the cross head, means causing the cross-head to move the guide rods but allowing lost motion between said guide rods and cross head, and means tending to move the cross bar and frame toward each other and to move the frame forward.

31. In a machine for cutting dove tail slots the combination of a stationary frame, two pairs of bearings thereon, a guide rod mounted to slide in each of said pairs of bearings, a bar mounted on said guide rods and having a threaded engagement with each of said guide rods, a cross head mounted to slide on said guide rods and engaging therewith to move said guide rods with the cross head during part of its movement, a frame mounted to slide on said guide rods between said cross head and said bar, an adjustable connection providing lost motion between said cross head and said frame for drawing the frame rearwardly after the cross head, a pair of weights joined by flexible connections with said sliding frame, said flexible connections passing over pulleys mounted on stationary axles on the fixed frame, said weights tending to pull the sliding frame forward against the rearward pull of the cross head.

32. In a wood working machine, the combination of a bar and a frame, constituting the opposing jaws of a clamp, yielding means tending to move said bar and frame toward each other, and hold them against relative movement, said means engaging a fixed support in such a manner as to increase the resistance of the yielding means to the relative movement of the bar and frame when they move together in one direction, means producing reciprocating motion, and connections between said means and said bar and frame, allowing lost motion between said means and said frame and between said bar and said frame, whereby the bar may yieldingly clamp the work against the frame and the latter be fed by the reciprocating means in one direction the desired distance, and both be moved thereby in the opposite direction.

33. A work clamp comprising a frame and a bar, means for yieldingly drawing and holding them together to clamp stock between them and means for moving them simultaneously, said yielding means increasing the pressure of the clamp on the stock after the stock is clamped between the frame and bar and the rearward movement of them has begun.

34. In a machine for cutting dove tail slots the combination of a frame and a cross head mounted to reciprocate together, the cross head having an additional movement independent of the frame, a shaft mounted to rock on the frame, a crank on said shaft, a link connecting said crank and said cross head whereby rocking movement is imparted to the shaft when the cross head moves independent of the frame, said shaft remaining stationary when the cross head and frame move together, means connecting the frame to the cross head and moving it therewith for part of the movement of the cross head.

35. The combination with one or more sliding guide rods having means to engage and move the work in one direction, of means to positively move said rod or rods in at least one direction, and having an adjustable lost-motion engagement therewith guided thereon, and a means also slidably guided on said rod or rods for clamping the work to the first named means.

36. In a machine for cutting blind dove tail slots, the combination of a stationary frame, a pair of guide rods mounted to slide on said frame, a cross head mounted to slide on and with said guide rods, means to cause the cross head and rods to move rearwardly, first together, then sliding the cross head on the rods, and then moving them together, and to move forward, first together, then sliding the cross head on the rods, and then moving them together to the end of their travel, a cross bar fastened to said guide rods and moving therewith, and a frame resting on said guide rods and capable of movement independently thereof and yielding means for drawing said cross-bar and frame toward each other without interfering with the additional movements thereof, means for holding the guide rods stationary while the cross head slides thereon.

In testimony whereof I affix my signature in presence of two witnesses.

FRANK O. ANDERSON.

Witnesses:
LYNN W. EDDY,
RAYMOND C. OLSON.

Copies of this patent may be obtained for five cents each, by addressing the "Commissioner of Patents, Washington, D. C."